Nov. 26, 1968     A. E. FRANZ     3,413,014

TRANSPORTATION MEANS FOR COMBINE HEADER OR THE LIKE

Filed Sept. 26, 1966     2 Sheets-Sheet 1

INVENTOR.
ADOLPH E. FRANZ

BY Duane C. Bowen

ATTORNEY

Nov. 26, 1968   A. E. FRANZ   3,413,014
TRANSPORTATION MEANS FOR COMBINE HEADER OR THE LIKE
Filed Sept. 26, 1966   2 Sheets-Sheet 2
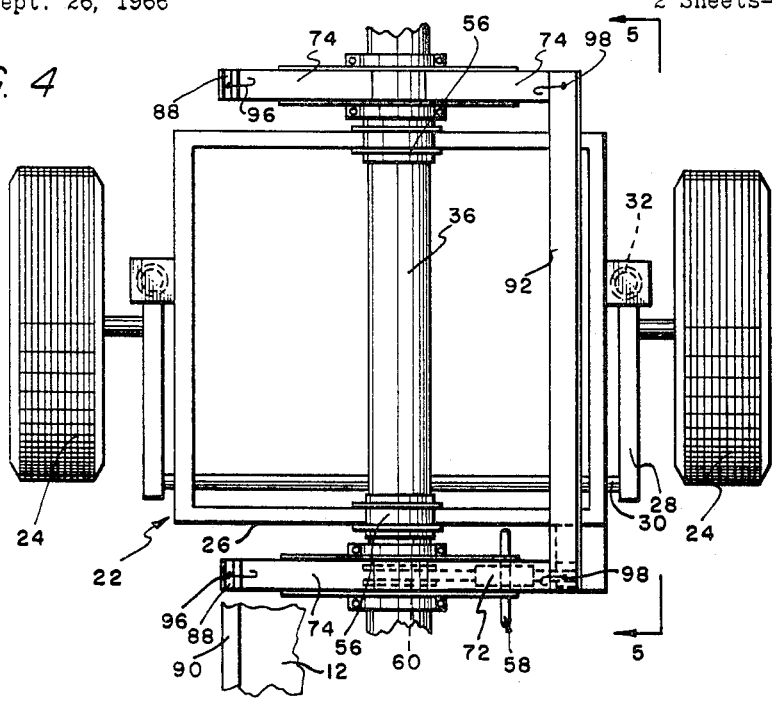
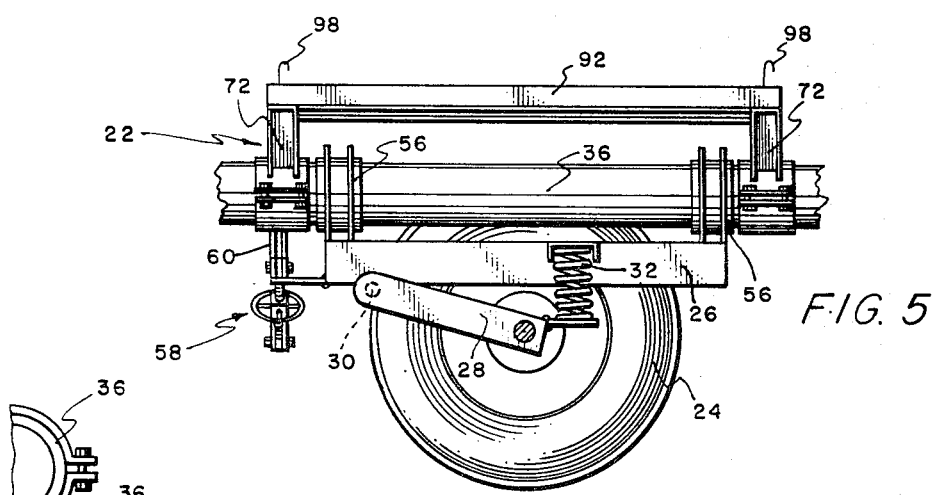
INVENTOR.
ADOLPH E. FRANZ
BY
ATTORNEY United States Patent Office 3,413,014
Patented Nov. 26, 1968

3,413,014
TRANSPORTATION MEANS FOR COMBINE
HEADER OR THE LIKE
Adolph E. Franz, c/o Newton Mfg. Co., 110 E. 17th St.,
Newton, Kans. 67114
Filed Sept. 26, 1966, Ser. No. 581,987
6 Claims. (Cl. 280—400)

My invention relates to a vehicle for transportation of a combine header or the like in which the header needs to be transported separately from the combine because of excessive widths of the header in normal disposition for highway travel or the like. The vehicle is adapted for full support of the header during disconnection of the header from, or connection to, the combine to avoid the usual difficulty of binding of securing means, or mislocation, when the header is inadequately supported. For full support of the header during disconnection from the combine, the vehicle has support means adjustable in upright planes fore and aft of the combine and transversely of the combine.

The following description, and claims, are in terms of a combine and a header therefor, but are meant to include other like agricultural implements that are similar even if at present or some time in the future a different terminology is used for essentially similar apparatus, e.g., a vehicle having broad crop harvesting means which is detachable for transportation because of excessive width for highway travel or the like. The description and drawings will be devoted to a type of a self-propelled combine or harvester-thresher in common use particularly in harvesting wheat or the like. These combines are manufactured in different sizes and with different width headers; but most commonly, if not invariably, the header will be wider than eight feet which is a maximum for transporting any distance particularly on public highways. The self-propelled combine without the header is of permissible width to be driven on a highway although it usually will be carried on a truck or the like if any substantial distance is involved; and, of course, trucking is necessary with a custom cutter who may harvest in locations from Texas to Canada, for example, in a season. Even when the combine is transported by truck, the header needs to be disconnected because of width considerations. A combine usually will have hydraulic powered means to raise and lower the header, according to grain height. Of course the header will be raised during transportation and it will be observed to be a cantilevered, heavy, awkward load, so removal of the header for transportation a substantial distance would be indicated even without header width problems. It is an objective of my invention to provide transportation means for a header in which the long dimension of the header will be fore and aft of the transporting means to avoid header width problems. It is a further objective of my invention to provide various desirable features for such a vehicle including good load support and security, minimizing stability problems with the high center of gravity load, economy, etc.

A principal problem in header disconnection is binding of means securing the header to the combine due to inadequate header support. There is a similar problem in locating the header properly for connection to the combine. A usual attempt to support a header during disconnect and connect is in terms of blocking, shimming, and jacking, but it has proven difficult to support the header adequately enough to prevent binding of securing parts, etc. Considerable amounts of time and energy have been devoted to header disconnect and connect and the situation has been most unsatisfactory. It is an objective of my invention to provide support means, particularly in a trailer or the like, which adequately and accurately supports the header during connect and disconnect operations. More particularly it is an objective of my invention to provide such support means which is adjustable in a plane fore and aft of the combine and in a plate lateral of the combine. It is an additional objective of my invention to provide such support means which are simple to operate, rugged, and economical but are completely adequate for the job.

My invention will be best understood, together with additional objectives and advantages thereof, from a reading of the following description, read with reference to the drawings, in which:

FIGURE 4 is a partial top view of the trailer.

FIGURE 5 is a side view, partly in section, taken on line 5—5 of FIGURE 5.

FIGURE 6 is an enlarged view, partly in section, of pivotal adjusting means on the trailer.

Figure 1:
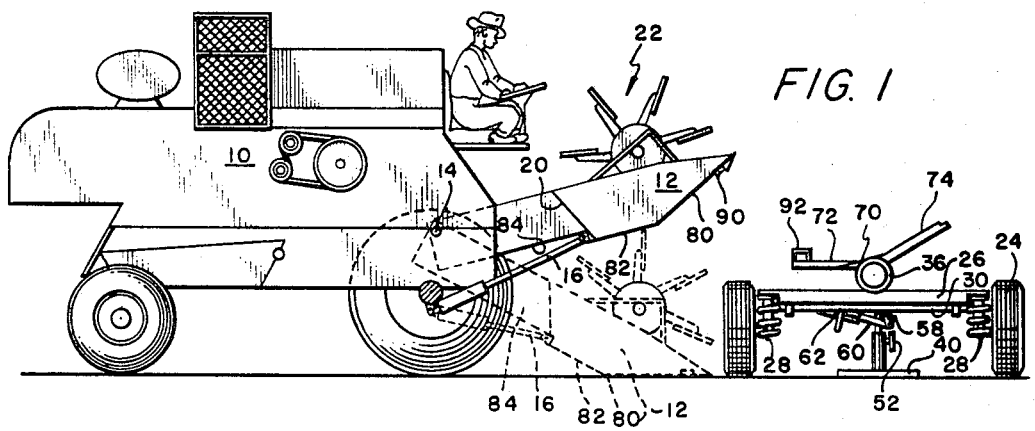
FIGURE 1 is a side view of a combine (partly broken away to show hidden parts) with its header shown in a dotted line lower, operating position and shown in full lines in a raised position, the combine being shown as approaching a trailer which forms a specific embodiment of my invention.

FIGURE 1 shows a typical self-propelled combine 10 having a header 12. Header 12 is shown in dotted lines in a lower operating position. The header is pivotally mounted, to pivot about an axis at 14, and hydraulic pistons and cylinders 16 between header 12 and the tractor frame power raising and lowering of header 12. Of course, one purpose of the pivotal adjustment is to adjust cutting level of the header in operating position. A second purpose of the pivotal adjustment of header 12 is to raise the same to an upper position such as that shown in full lines in FIGURE 1 during transporting of the combine from one cutting location to another or to raise the header for convenience in detachment-attachment to the extent an upper position is advantageous.

The combine 10 shown is somewhat typical, in configuration, to a "Gleaner" combine manufactured by Allis-Chalmers in which the header is detached from the remainder of the pivotal assembly (which will house the cylinder and the beater in some combines and merely may house a conveyor in other combines) at a plane indicated by reference character 20 which is the rear end of the broad header housing and at the forward end of the narrower portion of the pivotally mounted assembly. In this Allis-Chalmers assembly the attachment is by means of four hook type fasteners. Of course I do not mean to be limited to this combine configuration and my invention is equally adaptable to and useful for other combines on the market. For example, Massey-Ferguson has a generally similar configuration except the header attachment-detachment is at the pivot 14, and by invention equally applies to that system.

As before related, the problem in detachment of a header for transportation and of re-attachment is that the header is bulky and heavy and the attachment system is subject to bind interfering with detachment, and during connection, it is difficult to locate attachment points accurately enough. In the past the attachment-detachment operation has been most time consuming and unsatisfactory. My solution is to completely support the header so that there will be no binding forces on the attachment system during detachment and so that the header may be exactly positioned relative to the attach points during header attachment. In fact, the attachment-detachment operation with my equipment can be readily accomplished by even one man; whereas in the past attachment-detachment was a laborious operation even with several men working.

Turning now to the construction of the header support and transport equipment, a two-wheeled trailer 22 is shown in the drawings, which is the preferred form of the invention although the principles of the invention can apply to other support and/or transport means. As will be reviewed in more detail later, the two wheels 24 of trailer 22 provide pivotal adjustment means, e.g., the header support assembly pivots on the axis of rotation of wheels 24.

Wheels 24 support a bed or chassis 26. The support system includes a pair of arms 28 rigidly secured to a rigid (not a so-called "torque" or resilient) shaft 30 pivotally secured to the underside of bed 26. By these means, wheels 24, rotatably mounted on arms 28 (in a cantilevered, stub-axle manner) will move together relative to bed 26 and the load thereon. Coil springs 32 (schematically indicated) preferably are secured to act both in tension and compression and to provide shock absorption in the support system. The reason for wheels 24 to be tied together, to move in unison when bumps or depressions occur in the road or ground (rather than to be individually shock mounted), is to avoid the lateral upsetting action on a top heavy load when one wheel can move vertically independently of the other relative to bed or chassis.

Figure 2:
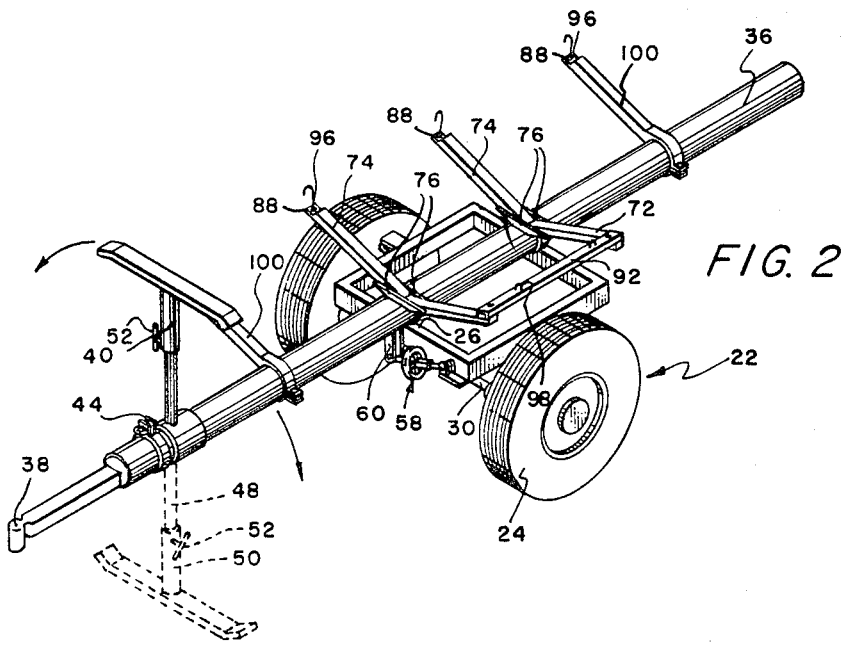
FIGURE 2 is a perspective view of the trailer, its foot member being shown in full lines in upper transporting position and being shown in dotted lines in its lower supporting position.
Figure 3:
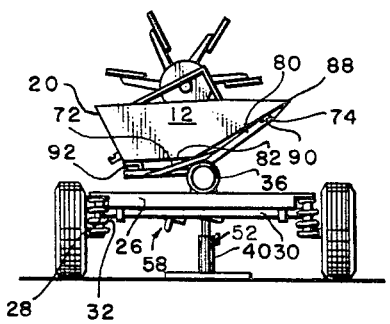
FIGURE 3 is an end view showing the trailer with a header supported thereon.

Longitudinal beam means are provided by a long and sizable tubular member 36. Some type of trailer hitch 38 is provided at one end for transportation by towing. A foot member 40 is in depending, supporting position during header loading and unloading. It is connected to tubular member 36 by means of a rotatable collar 42 and is secured in upwardly extending position (full lines in FIGURE 2) during transportation by suitable locking means 44 such as a pin to be secured in aligned openings.

As will be described again later, foot member 40 provides means for adjusting the pivotal position of the header support assembly (about the axis of rotation of wheels 24). The adjustment of the length of foot member 40 (for pivotal adjustment of tubular member 36) is accomplished by inner telescoping part 48 and outer telescoping part 50 which may be secured in position by means of setscrew means 52.

Tubular member 36 is rotatably mounted on bed 26 by bearing means 56, which accomplishes another pivotal movement in head support adjustment. The pivotal position of tubular member 36 is adjusted by means 58 including a crank arm 60 and a screw mechanism 62 pivotally connected at one end at 64 to crank arm 60 and at the other end at 66 to bed 26.

The principal supports for header 12 are provided by V-shaped rests 70 having first rest portions 72 and second rest portions 74 secured in broad V disposition. The rest portions may be formed with channel shaped sections and may have braces 76 for added strength. The V-shaped rests 70 have two aspects. It will be noted in the drawings that the header shown has a first, forward portion 80 that will be substantially horizontal in operation and may be thought of as a flat bottom. Rearward of flat bottom 80 are inclined portions 82, that may be termed the rear, lower surfaces of the header. As stated before, in the Allis-Chalmers combine the separation of the header is accomplished in the upright plane 20. However, in the Massey-Ferguson combine the disconnect is at the pivot point 14, so that the rear lower surface extends past plane 14 to include the remaining inclined surfaces 84. In either model of combine, there is some V relationship between the forward and rear lower header surfaces, so that first rest portion 72 may be thought of as supporting the lower rear portion of the header and second rest portion 74 may be thought of as supporting the forward flat bottom surfaces. On the other hand, a header could be constructed with lower surfaces not making a simple V, could be curved, etc., so it is only in a broad sense that a V rest if specified to conform to broad V lower surfaces common to headers.

I provide definite attach points between the header and rest means 70, including recesses 88 at the end of rest portions 74 to receive the header bar 90, and plate means 92 between the ends of rest portions 72 which is disposed below a header frame member at the plane of header separation 20. In this sense, the support of the header is to header bar 90 (via recesses 88 in rest portions 74) and to the rear header frame (via plate 92) rather than by the broad V rest portion 72, 74. Further, bolt means are provided at 96, at the ends of rest portions 74, to secure to openings formed in header bar 90, and bolt means are provided at 98 in plate 92 to attach to some part of header 12, such as to the hook type fasteners used in the Allis-Chalmers header.

It will be understood from the foregoing that essentially V-shaped rests are convenient with present configurations of headers, but support of (and securing to) header frame or other heavy members at forward and rear locations is equally basic and it would be possible, at perhaps some inconvenience, to provide rest means equivalent to the V-shaped rests shown but not necessarily of strictly V-shape. The essential point is full and adequate support so that, once the support is correctly located, attachment devices will be supported against binding in disconnect, and attachment points may be accurately aligned in the attachment operation.

According to the foregoing, adequate rest means are provided, and now I will describe the system and operation of properly positioning the rest means, which is fundamental to my invention. It should be realized that it can not be presumed combine 10 and trailer 22 are located on absolutely flat ground or other surface when connect to or disconnect is to be accomplished. To the contrary, it is to be presumed that the surfaces will not be flat, which will certainly be a justified assumption in field conditions wherein combin 10 and trailer 12 may not be located on ground that even has the same slope or even has inclination in exactly the same direction. My invention makes the condition of the supporting ground or the like, within reason, rather immaterial, although normally a relatively flat location would be selected.

There are essentially three adjustments in my system of operation. One is the pivoting of the header 12 up and down by means of the hydraulic pistons and cylinders 16, which is already a common feature of combines. The second adjustment is poviting of V-shaped rests 70, with tubular member 36, by means of the adjustment provided by the hand wheel of screw adjustment means 58. This second adjustment may be said to be made in an upright plane extending substantially fore and aft of the combine (and laterally of the trailer). It will be understood from the drawings that the header 12 is disposed on the trailer with its long dimension disposed longitudinally of the trailer, so that the width of trailer and load (header) will be not greater (i.e. eight feet) than that readily transportable even on a highway. The third pivotal adjustment is in an upright plane lateral of the combine and longitudinal of the trailer. This is accomplished by pivoting of tubular member 36 (and rest means 70 thereon) about the axis of rotation of wheels 24 (which may be blocked in place particularly if there is inclination to the ground). Adjustment of pivoting of tubular member 36 is through adjustment of leg 40 by means of its telescoping parts.

It will be understood that rests 70 may be readily disposed in any needed position by means of the pivoting of the rests lateral of the trailer and essentially by pivoting of the entire trailer in an upright plane longitudinal of the trailer. The pivoting of the header by the combine in disconnection is merely to lower it onto rests 70. In the case of a header connected and disconnected at a plane like that at 20, in connection the cylinder-beater or conveyor housing is merely pivoted to a suitable level for connection with the header positioned on trailer 22, adjustments being made in all three means until attach points are accurately aligned. In the case of a header disconnected at pivotal axis 14, during connection all adjustments in positioning would be made by the trailer. Of course another factor will be positioning of the trailer a suitable distance in front of the combine and lateral thereof. Of course the trailer may be located and the combine driven into proper position, or the combine may be left stationary and the trailer positioned relative to the combine, or both may have some adjustment in position.

Experience has shown (and this will be largely self-evident) that the adjustments in the various pivotal mechanisms in header connected and disconnect are readily made and even one man can load or unload a header with minimum time and effort, and experience has proven this to be a great improvement over the man-handling, brute force, and makeshift operations that have previously characterized header connects and disconnects.

I have provided a pair of V-shaped rests 70 and have also provided a pair of arms 100, at the end portions of tubular member 36, that further support header 12 and are made like rest portions 74. These have recesses 88 receiving header bar 90 and bolt means 96 may be provided for arms 100 in addition to or as a substitution for bolts 96 on rest portions 76. J bolts may be convenient for bolt means 96 or 98.

It will be understood from the foregoing how I provide for ready header connect, disconnect and transportation. Having thus described my invention, I do not wish to be understood as limiting myself to the precise details of construction shown, but instead I wish to cover those modifications thereof which will occur to those skilled in the art after learning of my invention, and which are properly within the scope of my invention.

I claim:

1. Means adapted to receive and fully support a header in disconnection from or connection to a combine to avoid binding of the securing means between the header and the combine, and to avoid mislocation, by being adjustable to the disposition of the header relative to the ground in a first upright plane fore and aft of the combine and in a second upright plane transverse of the combine, the combine having means for raising and lowering the header, comprising:
   (a) support means from the ground, V-shaped rest means, and said support means including pivotal mounting means for said rest means permitting pivoting in said first upright plane, and means operable to adjust the pivotal position of said rest means in said first upright plane, said V-shaped rest means including first and second rest portions disposed in V relationship to each other with the first rest portion disposed to support the rear lower surface of the header and with the second rest portion disposed to support the header bottom,
   (b) said support means including pivotal means for pivotal movement in said second upright plane of at least a portion of said support means including said pivotal mounting means and said rest means supported thereby, and means operable to adjust pivotal position in said second upright plane,
   (c) whereby adjustment of position of said V-shaped rest means to fully support said header is accomplished by raising and lowering said header and by pivotal adjustment in rest and support means in said first and second upright planes,
   (d) a tubular member extending longitudinally of said vehicle to which said rest means is secured and said pivotal mounting means for said rest means permitting pivoting in said first upright plane being pivotal mounting means for said tubular member.

2. The subject matter of claim 1, in which there is a crank arm secured to said tubular member and a threaded mechanism between said crank arm and another portion of said vehicle forming said means operable to adjust the pivotal position of said rest means in said first upright plane.

3. The subject matter of claim 1 in which there is a rotatable collar around said tubular member near one end which connects said foot member to said vehicle, said foot member being rotatable from a depending, supporting position during header loading to a position extending upwardly from said tubular member during transportation and there being lock means connected to said tubular member and operable to lock said foot member in said position extending upwardly during transportation.

4. The subject matter of claim 1, in which there are two rests means and plate means connecting together said first rest portions of said two rest means, and an arm shaped like said second rest portion secured to each end portion of said tubular member for further support of said header bottom, and bolt means secured to at least part of said rest portions, plate means and arms for fastening to adjacent portions of said header.

5. A vehicle for supporting a combine header in longitudinal disposition thereon so that the vehicle and header thereon may be transported on a highway or the like without excessive width, comprising:
   (a) wheeled support means,
   (b) rest means on said wheeled means with first and second rest portions disposed laterally of the vehicle and the header with the first rest portion supporting the lower rear surface of the header and with the second rest portion supporting the header bottom at a forward location,
   (c) said rest means being pivotally mounted on the wheeled support means to pivot about an axis extending longitudinally of the vehicle, and means operable to adjust the pivotal position of said rest means whereby said rest means may be pivotally adjusted in position for the purpose of adjusting to the disposition of said header in loading the same, or for the purpose of header location in connection to a combine,
   (d) said wheeled means including means operable to pivotally adjust the disposition of said rest means as a unit about an axis laterally of said vehicle for the purpose of adjusting to the disposition of said header in loading the same, or for the purpose of header location in connection to a combine,
   (e) the wheels of said wheeled means consisting of one set of wheels side by side on said axis laterally of said vehicle which thereby form a lateral pivot axis for said rest means, a foot member at one end of said vehicle to rest on the ground, said foot member having telescoping parts for adjustment of length and means operable to secure said telescoping parts in adjusted position thereby to adjust the pivotal disposition of said rest means about said axis lateral of said vehicle,
   (f) beam means supported longitudinally of said vehicle on which said rest means are mounted, and said foot member being connected to said beam means near one end, and hitch means at said one end of said beam means for securing said vehicle to a powered vehicle for towing in the manner of a trailer,
   (g) said beam means being a tubular member, and a bed supported by said set of wheels, and said tubular member being rotatably mounted on said bed thereby providing the pivotal mounting for said rest means.

6. A vehicle for supporting a combine header in longitudinal disposition thereon so that the vehicle and header thereon may be transported on a highway or the like without excessive width, comprising:
   (a) wheeled support means,
   (b) rest means on said wheeled means with first and second rest portions disposed laterally of the vehicle and the header with the first rest portion supporting the lower rear surface of the header and with the second rest portion supporting the header bottom at a forward location, (c) said rest means being pivotally mounted on the wheeled support means to pivot about an axis extending longitudinally of the vehicle, and means operable to adjust the pivotal position of said rest means whereby said rest means may be pivotally adjusted in position for the purpose of adjusting to the disposition of said header in loading the same, or for the purpose of header location in connection to a combine, (d) said rest means including a plurality of said rest means side by side supporting said header.

References Cited

UNITED STATES PATENTS

| | | | |
|---|---|---|---|
| 2,660,443 | 11/1953 | Miller | 280—33.4 |
| 3,118,552 | 1/1964 | Behr | 214—500 |
| 3,273,912 | 9/1966 | Crockett | 280—104 |

LEO FRIAGLIA, *Primary Examiner.*

J. SIEGEL, *Assistant Examiner.*